US007451098B2

(12) United States Patent
Ingman et al.

(10) Patent No.: US 7,451,098 B2
(45) Date of Patent: Nov. 11, 2008

(54) METHOD, SYSTEM, AND COMPUTER PROGRAM PRODUCT FOR ASSIGNING MULTIPLE TELECOMMUNICATIONS TECHNICIANS AT ONE TIME TO AT LEAST ONE SKILL AND A TURF

(75) Inventors: Robert Mitchell Ingman, Peachtree City, GA (US); Terri H. Pifer, Kennesaw, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1191 days.

(21) Appl. No.: 10/161,250

(22) Filed: May 31, 2002

(65) Prior Publication Data

US 2004/0111311 A1    Jun. 10, 2004

(51) Int. Cl.
*G06F 17/60* (2006.01)
(52) U.S. Cl. .................. 705/9; 342/357.13; 379/9.02
(58) Field of Classification Search ................ 705/9
See application file for complete search history.

(56) References Cited

U.S. PATENT DOCUMENTS

| | | | | |
|---|---|---|---|---|
| 5,920,846 A * | 7/1999 | Storch et al. | ................ | 705/7 |
| 5,943,652 A * | 8/1999 | Sisley et al. | ................ | 705/9 |
| 6,085,166 A * | 7/2000 | Beckhardt et al. | ............ | 705/9 |
| 6,169,517 B1 | 1/2001 | Eslambolchi et al. | | |
| 6,272,457 B1 | 8/2001 | Ford et al. | | |
| 6,611,751 B2 | 8/2003 | Warren | | |
| 6,850,895 B2 * | 2/2005 | Brodersen et al. | ............ | 705/9 |
| 6,873,949 B2 | 3/2005 | Hickman et al. | | |
| 6,990,458 B2 * | 1/2006 | Harrison et al. | ............... | 705/8 |
| 7,003,475 B1 * | 2/2006 | Friedland et al. | ............. | 705/9 |
| 7,107,285 B2 | 9/2006 | Von Kaenel et al. | | |
| 7,340,037 B1 * | 3/2008 | Jean et al. | ............... | 379/9.02 |
| 7,346,531 B2 * | 3/2008 | Jacobs | ........................ | 705/8 |
| 2002/0010615 A1 | 1/2002 | Jacobs | | |
| 2002/0029161 A1 | 3/2002 | Brodersen et al. | | |
| 2002/0032026 A1 | 3/2002 | Kaupe | | |
| 2002/0035460 A1 | 3/2002 | Hales | | |

(Continued)

FOREIGN PATENT DOCUMENTS

JP          08044799 A  *   2/1996

(Continued)

OTHER PUBLICATIONS

Marmel, Microsoft Project 2000 Bible, Mar. 30, 2000, IDG Books Worldwide, Inc., p. 120.*

(Continued)

*Primary Examiner*—Beth V Boswell
*Assistant Examiner*—Justin M Pats
(74) *Attorney, Agent, or Firm*—Scott P. Zimmerman, PLLC

(57) ABSTRACT

Methods and systems are disclosed for assigning multiple technicians to turfs and to skills. One method allows a user to interface with an Integrated Dispatch System and assign multiple technicians to a turf. The turf designates a geographic area within a telecommunications network. The multiple technicians and the turf are displayed via a graphical user interface on a computer. Another method allows the user to assign multiple technicians to a skill. The skill describes a qualification for installing or for repairing elements of the telecommunications network. The multiple technicians and the skill(s) are displayed via the graphical user interface.

12 Claims, 7 Drawing Sheets

U.S. PATENT DOCUMENTS

2002/0054082 A1   5/2002   Karpf
2003/0204431 A1   10/2003  Ingman

FOREIGN PATENT DOCUMENTS

JP          10143557 A  *  5/1998

OTHER PUBLICATIONS

Marmel, Microsoft Project 2000 Bible, Mar. 30, 2000, IDG Books Worldwide, Inc., p. 42-47.*
Lesaint et al., Dynamic Workforce scheduling for British Telecommunications, INFORMS, Jan.-Feb. 2000, p. 45-52.*
Lesaint et al. "Dynamic Workforce scheduling for British Telecommunications" INFORMS. Jan.-Feb. 2000.

* cited by examiner

METHOD, SYSTEM, AND COMPUTER PROGRAM PRODUCT FOR ASSIGNING MULTIPLE TELECOMMUNICATIONS TECHNICIANS AT ONE TIME TO AT LEAST ONE SKILL AND A TURF

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to computers and to telecommunications and, more particularly, to methods and systems for assigning multiple technicians to a particular turf, or a particular skill level, when repairing a telecommunications network.

2. Description of the Related Art

When a telecommunications network requires repair, technicians are currently assigned one at a time to a turf or to a skill level. When a technician needs to be reassigned to another turf or to an additional skill level, the current work order dispatch system only permits reassigning one technician at a time. A computer user, for example, accesses a particular technician's schedule and reassigns that technician to a new turf or to an additional skill. The computer user then accesses the next technician's schedule, reassigns this next technician to a turf or a skill level, and then moves on to another technician. The computer user must individually access each technician's schedule and iteratively assign each technician to a new turf or to a new skill level. This iterative process requires two-to-three minutes per technician. So, if the computer user must reassign twenty (20) technicians, this iterative process requires upwards of one hour for the twenty technicians. The current iterative process creates a time-consuming disruption in each day, and the current iterative process prevents supervisors and managers from completing more value-added tasks.

An example provides further illustration. The telecommunications network, during a typical day-to-day operation, might experience a heavy repair workload on the south end of town, while the north end of town has a light workload. The technicians working in the north end are not normally assigned to the turfs of the south end, so a supervisor or manager might want to reassign some north-end technicians to help with repairs on the south end. The supervisor interfaces with the work order dispatch system and iteratively reassigns one technician at a time. Because this iterative process requires two-to-three minutes per technician, the supervisor spends an hour or more each time repair resources must be reassigned. During times of severe weather and of natural disasters, such as a hurricane, hundreds of technicians may need to be reassigned. The current iterative process thus becomes prohibitively time-consuming. The current iterative process also prevents adequate repair resources from being timely assigned for quick restoration of communications service.

There is, accordingly, a need in the art for an integrated dispatch system that permits assigning multiple technicians to turfs and to skill levels, a need for methods and systems that provide an easy, user-friendly method of assigning multiple technicians, and a need for methods and systems that quickly allow assignment of multiple technicians to turfs and to skill levels.

BRIEF SUMMARY OF THE INVENTION

The aforementioned problems are reduced by an enhanced Integrated Dispatch System. This enhanced Integrated Dispatch System comprises computer programs and computer systems for dispatching work orders for the repair of a telecommunications system. This invention allows multiple technicians to be assigned to selected turfs and skills. As the telecommunications network needs repair, the present invention allows more than one technician at a time to be assigned. Multiple technicians, and even entire groups of technicians, may be assigned to a particular turf and to particular skills. When a supervisor (or other computer user) assigns technicians to match the repair workload, this invention saves two-to-three (2-3) minutes per technician. So, if a supervisor has to assign thirty (30) technicians to a turf (or to a skill level) to ensure the repair workload is met, this invention saves the supervisor sixty-to-ninety (60-90) minutes per day. This time-savings may then be allocated to more value-added efforts. If 100 or more technicians need to be assigned, this invention saves several hours per day.

One aspect of this invention describes a method for assigning multiple technicians to a turf. A user is allowed to interface with the Integrated Dispatch System and to assign multiple technicians to a turf. The term "turf," as used herein, denotes a geographic area within a telecommunications network. A turf could be a territory, a wire center, the boundary of one or more wire centers, or a portion of a wire center. A turf could also be a composite of geographic areas, and the geographic areas may or may not be contiguous. As the user assigns the multiple technicians to the turf, the method displays the multiple technicians and the turf via a graphical user interface an a computer.

Another embodiment describes a method for assigning multiple technicians to a skill. The Integrated Dispatch System allows a user to assign multiple technicians to one or more skills. The skills describe one or more qualifications for repairing or for provisioning a telecommunications network. The enhanced Integrated Dispatch System causes the multiple technicians and skills to be displayed on a computer display via a graphical user interface.

Still another embodiment describes a computer system for assigning multiple technicians to turfs and skills. The system has the Integrated Dispatch System stored in a memory device. The Integrated Dispatch System manages the dispatch of work orders in a telecommunications network. The Integrated Dispatch System allows a user to assign multiple technicians to at least one of i) a turf and ii) a skill. The turf designates a geographic area within the telecommunications network, and the skill describes a qualification for repairing or for provisioning the telecommunications network. The system also has a processor communicating with the memory device and applying the turf and the skill to the multiple technicians.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
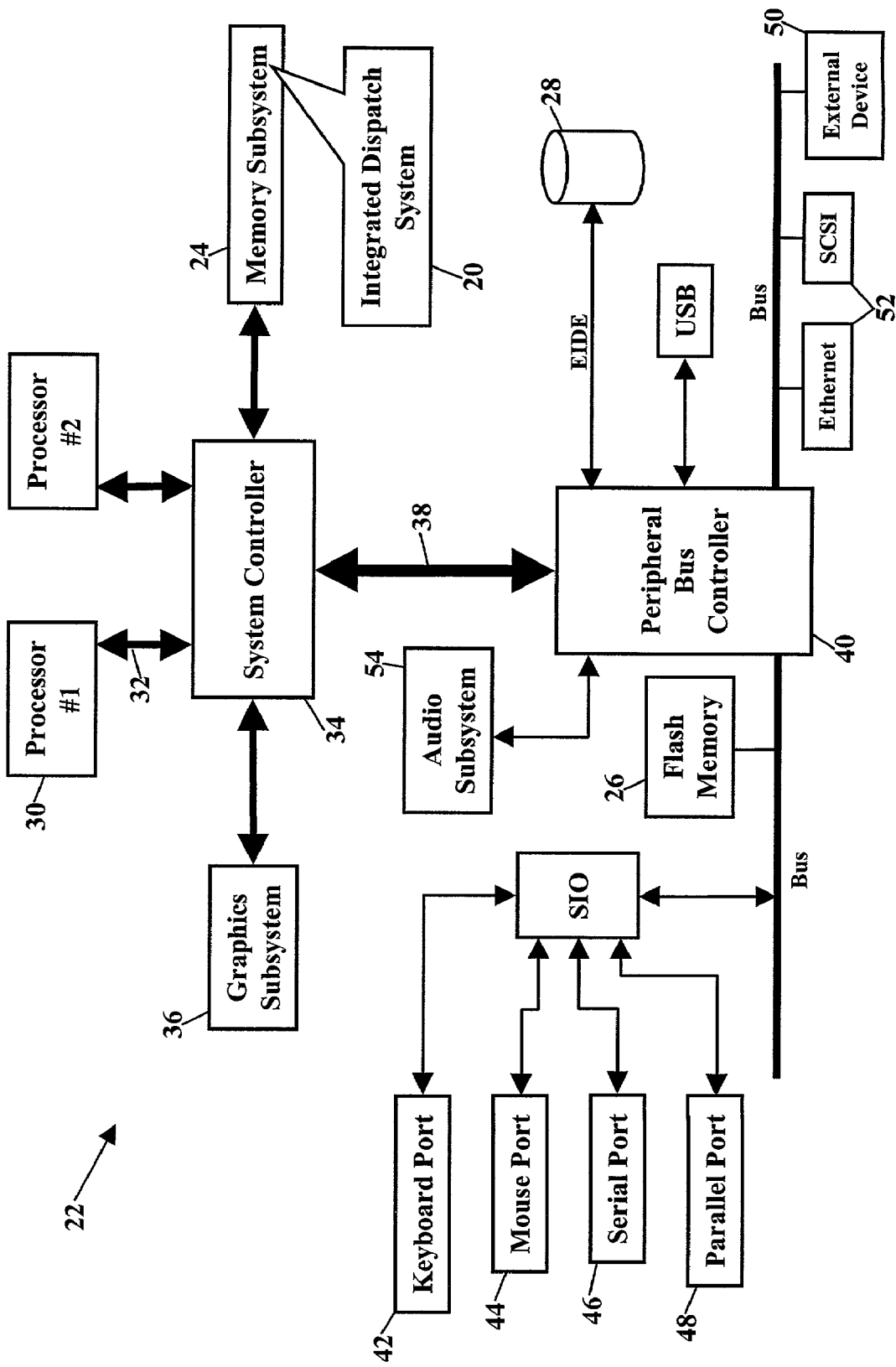
FIG. 1 is a block diagram showing one embodiment of the Integrated Dispatch System that resides in a computer system.

FIG. 1 depicts one possible operating environment for an embodiment of this invention. This embodiment of an Integrated Dispatch System 20 includes a computer program that allows a user to assign multiple technicians to turfs and to skill levels. As the user assigns multiple technicians, the Integrated Dispatch System 20 displays the multiple technicians via a graphical user interface on a computer. The user can indicate which technicians are to be assigned, such as by highlighting the name of each desired technician. The Integrated Dispatch System 20 may also allow the user to display a calendar or a schedule, so that the multiple technicians can be assigned for multiple days. The Integrated Dispatch System 20 then applies the assignments when planning the most efficient repair of the telecommunications network.

FIG. 1 is a block diagram showing the Integrated Dispatch System 20 residing in a computer system 22. The Integrated Dispatch System 20 operates within a system memory device. The Integrated Dispatch System 20, for example, is shown residing in a memory subsystem 24. The Integrated Dispatch System 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

The central processor 30 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). Sun Microsystems also designs and manufactures microprocessors (Sun Microsystems, Inc., 901 San Antonio Road, Palo Alto Calif. 94303, www.sun.com). The Intel Corporation manufactures microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is a UNIX®-based system (UNIX® is a registered trademark of The Open Group, 44 Montgomery Street, Suite 960, San Francisco, Calif. 94104, 415.374.8280, www.opengroup.org). Other operating systems, however, are also suitable. Such other operating systems would include WINDOWS® (WINDOWS® is a registered trademark of Microsoft Corporation, One Microsoft Way, Redmond Wash. 98052-6399, 425.882.8080, www.Microsoft.com). WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

Figure 2:
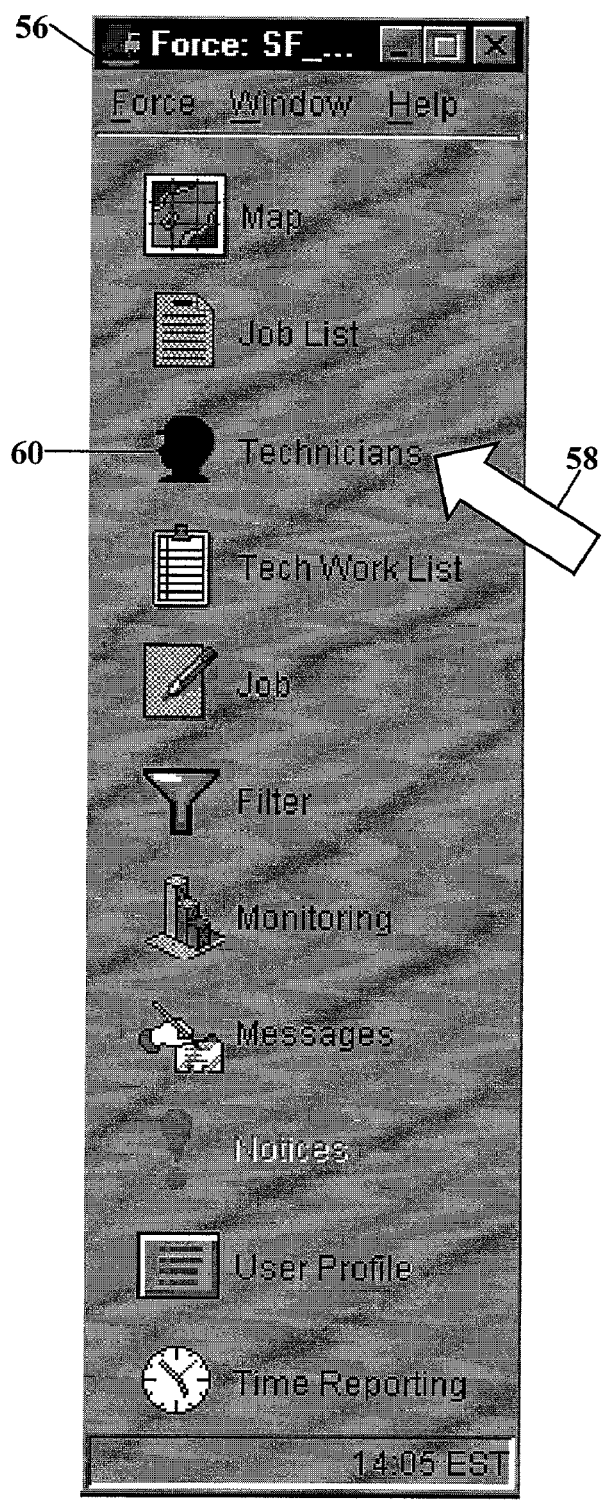
FIG. 2 is a screen shot showing an analyst graphical user interface.

FIG. 2 is a screen shot showing an analyst graphical user interface 56. The analyst graphical user interface 56 is just one menu of options presented by the Integrated Dispatch System (shown as reference numeral 20 in FIG. 1) on a computer display. When a user wants to assign multiple technicians to a turf or to a skill, the user requests a list of technicians from the Integrated Dispatch System. While the user could enter various commands to obtain this list of technicians, FIG. 2 shows the simple, user-friendly analyst graphical user interface 56. The user places a cursor 58 on the "Technicians" option 60, and the Integrated Dispatch System produces the list of technicians.

Figure 3:
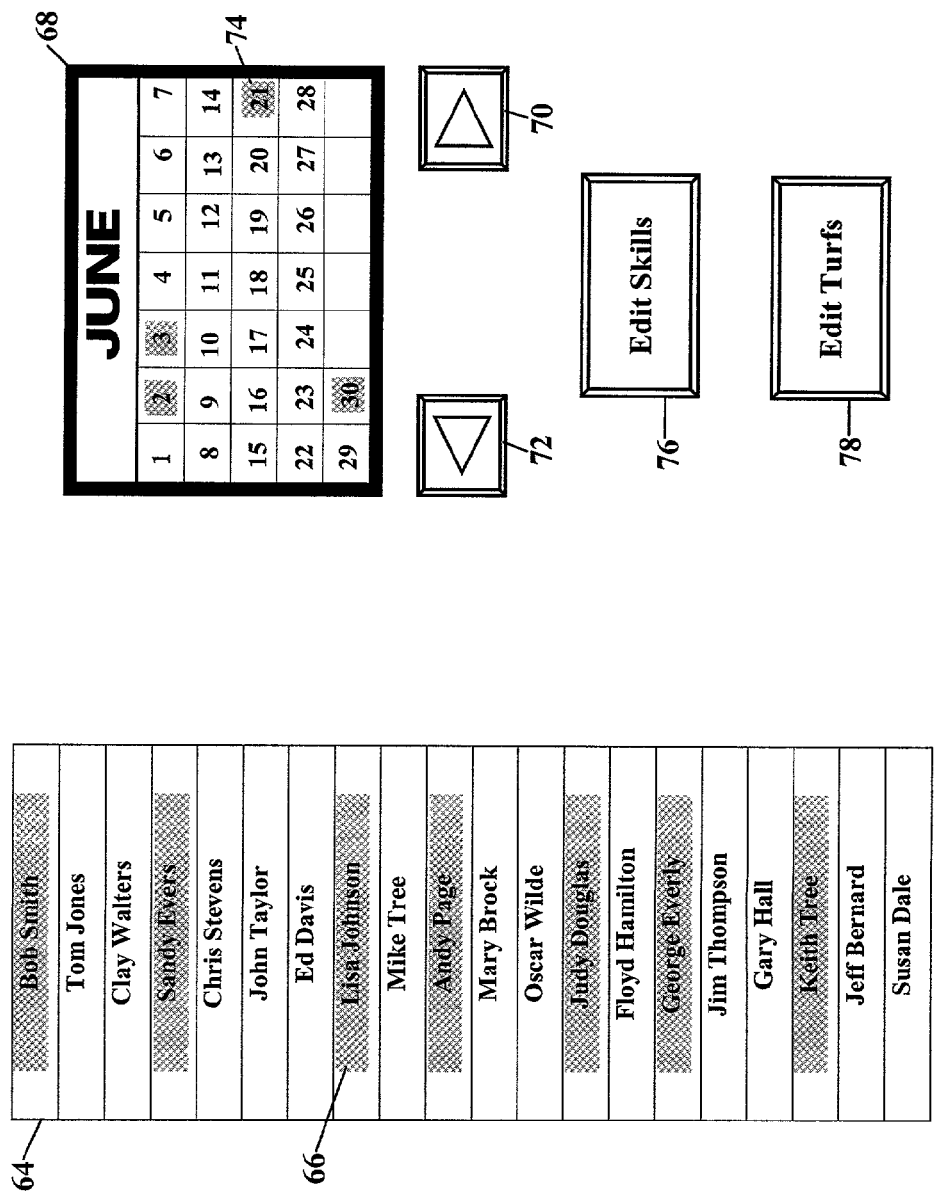
FIG. 3 is a schematic representing a technician graphical user interface according to one aspect of this invention.

FIG. 3 is a schematic representing a technician graphical user interface 62. This technician graphical user interface 62 displays a list 64 of technician names. The list 64 of technician names contains some or all of the technicians available to the user. The technician names could be sorted or arranged by area, by supervisor, by manager, by turf, by skill level, or by any other desired grouping or affiliation. FIG. 3, for simplicity, shows a short listing of twenty (20) technicians (there could be 100 or more technicians listed for a large metropolitan area). Once the list 64 of technician names is displayed, the Integrated Dispatch System allows the user to assign multiple technicians. The user interfaces with the Integrated Dispatch System and selects the names of the technicians to be assigned. The Integrated Dispatch System accepts any means of selecting the names of technicians, but the user preferably interfaces using a touch-sensitive device. The user, for example, uses a mouse, a keyboard, or a light pen to highlight 66 the name of each technician to be assigned. Once the user selects the technicians to be assigned, the user then selects what days the technicians will be assigned.

FIG. 3 also shows a calendar 68. Once the user selects the technicians to be assigned, the user then uses the calendar to select which days the technicians will be assigned. The calendar may display a day, a week, or a month of a year. The calendar could also represent a daily, weekly, or monthly work schedule. A forward control button 70 and a backward control button 72 allow the user to scroll and to select the desired day, week, or month. The user again interfaces with the Integrated Dispatch System and selects the desired day the multiple technicians will be assigned. The Integrated Dispatch System, as before, accepts any means of selecting the day of assignment, but the user preferably interfaces using the touch-sensitive device to highlight 74 the desired day. As FIG. 3 shows, if the user wishes to assign the multiple technicians to multiple days, the user simply selects all the desired days of assignment.

The user then selects to edit turfs or skill levels. After the multiple technicians have been selected, and after the desired days of assignment have been selected, the user then chooses to assign turfs or to assign skills. An "Edit Skills" control button 76 allows the user to assign one or more skills to the multiple technicians, while an "Edit Turfs" control button 78 allows the user to assign one or more turfs to the multiple technicians. If the user wishes to assign skills, the user interfaces with the Integrated Dispatch System and selects the "Edit Skills" control button 76 using the touch-sensitive device. If the user wishes to assign turfs, the user interfaces with the Integrated Dispatch System and similarly selects the "Edit Turfs" control button 78 using the touch-sensitive device.

Figure 4:
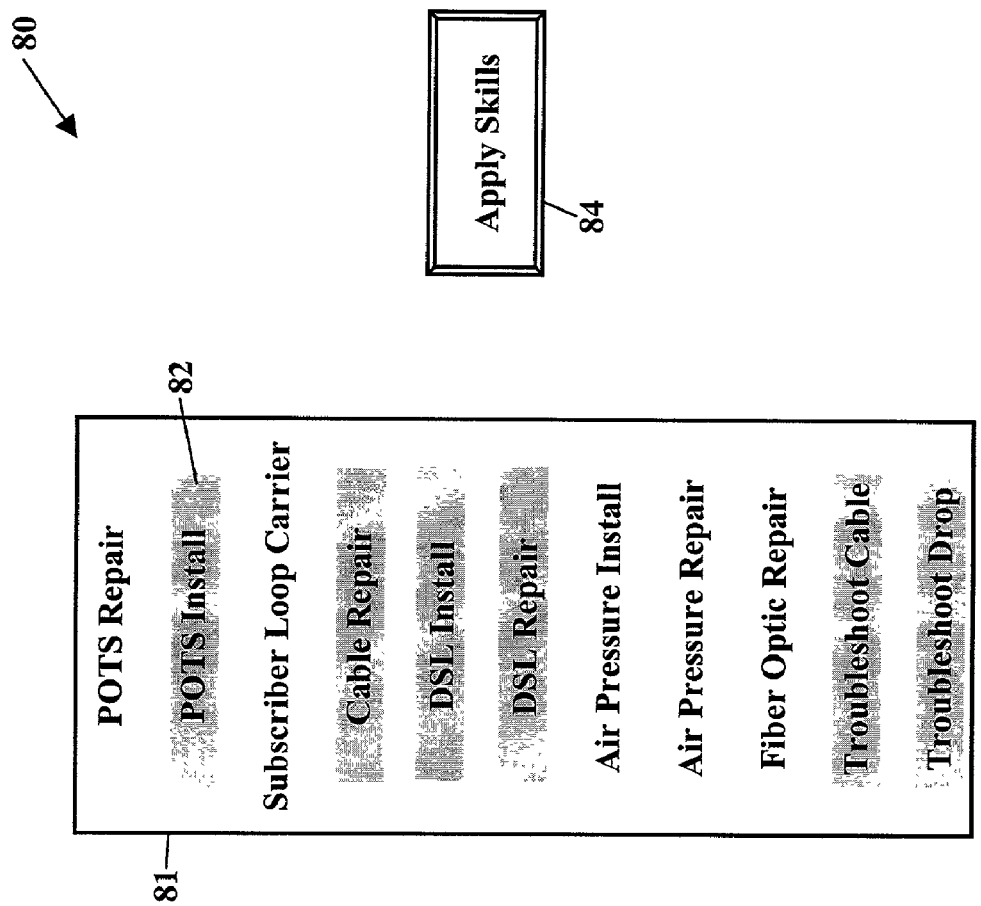
FIG. 4 is a schematic representing a skills graphical user interface according to one aspect of this invention.

FIG. 4 is a schematic representing a skills graphical user interface 80. When the user wishes to assign skills, the user selects the "Edit Skills" control button (shown as reference numeral 76 in FIG. 3) using the touch-sensitive device. The Integrated Dispatch System then causes the skills graphical user interface 80 to be presented on the display device of the computer system. The skills graphical user interface 80 shows a list 81 of skills for provisioning or for repair of the telecommunications network. Each skill describes a qualification for provisioning or for repairing the telecommunications network. The user again interfaces with the Integrated Dispatch System and selects the desired skill to be assigned to the multiple technicians. The Integrated Dispatch System, as before, accepts any means of selecting the skill, but the user preferably interfaces using the touch-sensitive device to highlight 82 the desired skill. If the user wishes to assign more than one skill to the multiple technicians, the user simply selects all the desired skills. Once the desired skills have been selected, the user applies the desired skills using an "Apply Skills" control button 84. The user preferably uses the touch-sensitive device to "click" or toggle the "Apply Skills" control button 84. The Integrated Dispatch System then applies the skill level changes to the multiple technicians for the desired days.

Figure 5:
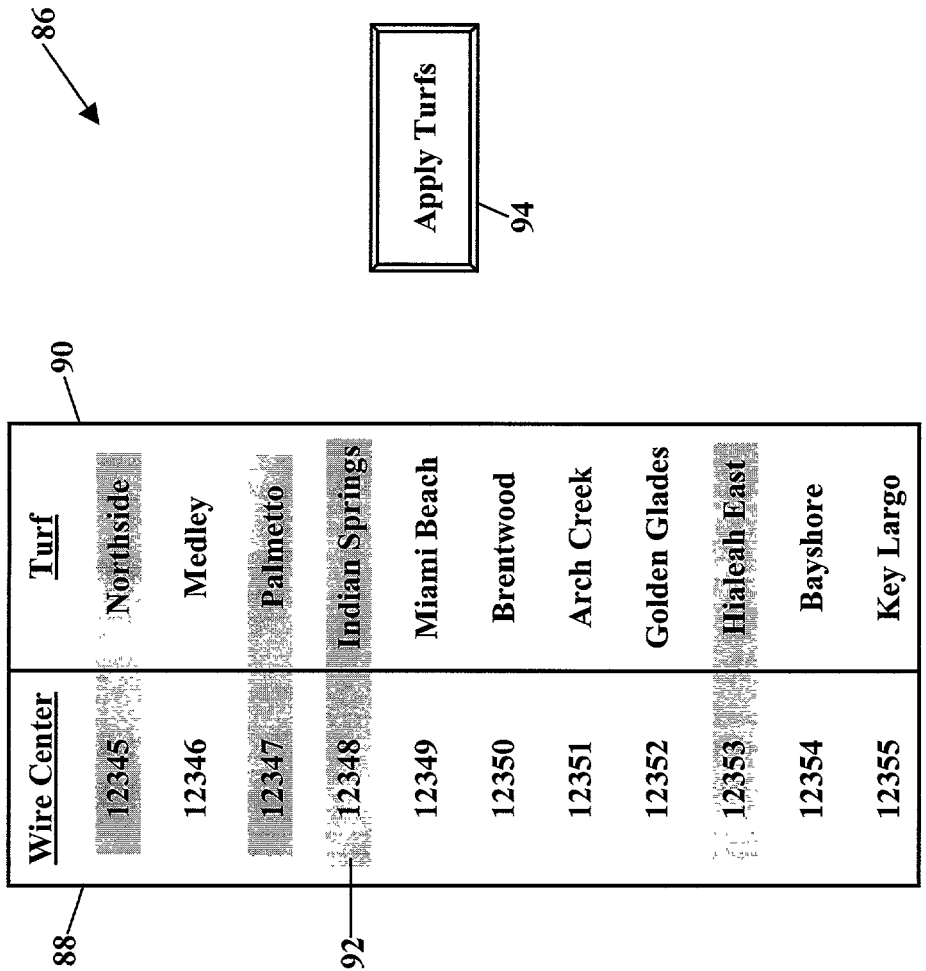
FIG. 5 is a schematic representing a turfs graphical user interface according to one aspect of this invention.

FIG. 5 is a schematic representing a turfs graphical user interface 86. When the user wishes to assign one or more turfs to the multiple technicians, the user selects the "Edit Turfs" control button (shown as reference numeral 78 in FIG. 3) using the touch-sensitive device. The Integrated Dispatch System then causes the turfs graphical user interface 86 to be presented on the display device of the computer system. The turfs graphical user interface 86 displays one or more turfs which can be assigned to the multiple technicians. Because a turf may encompass any geographic area and/or wire center, the turfs graphical user interface 86 includes a listing 88 of wire centers and a listing 90 of geographic areas. The user again interfaces with the Integrated Dispatch System and selects the desired turf to be assigned to the multiple technicians. The Integrated Dispatch System, as before, accepts any means of selecting the turf, but the user preferably interfaces using the touch-sensitive device to highlight 92 the desired turf. If the user wishes to assign more than one turf to the multiple technicians, the user simply selects all the desired turfs. Once the desired turfs have been selected, the user applies the desired turfs using an "Apply Turfs" control button 94. The user preferably uses the touch-sensitive device to "click" or toggle the "Apply Turfs" control button 94. The Integrated Dispatch System then applies the turf changes to the multiple technicians for the desired days.

After the turfs and the skills have been applied, the Integrated Dispatch System determines the most efficient provisioning and/or repair of the telecommunications network. As work orders are generated, the Integrated Dispatch System dynamically reviews the list of available technicians, their turfs, and their skill levels. The Integrated Dispatch System then tries to determine the most efficient work order assignments for the quickest, most economical dispatch of the telecommunications system.

Figure 6:
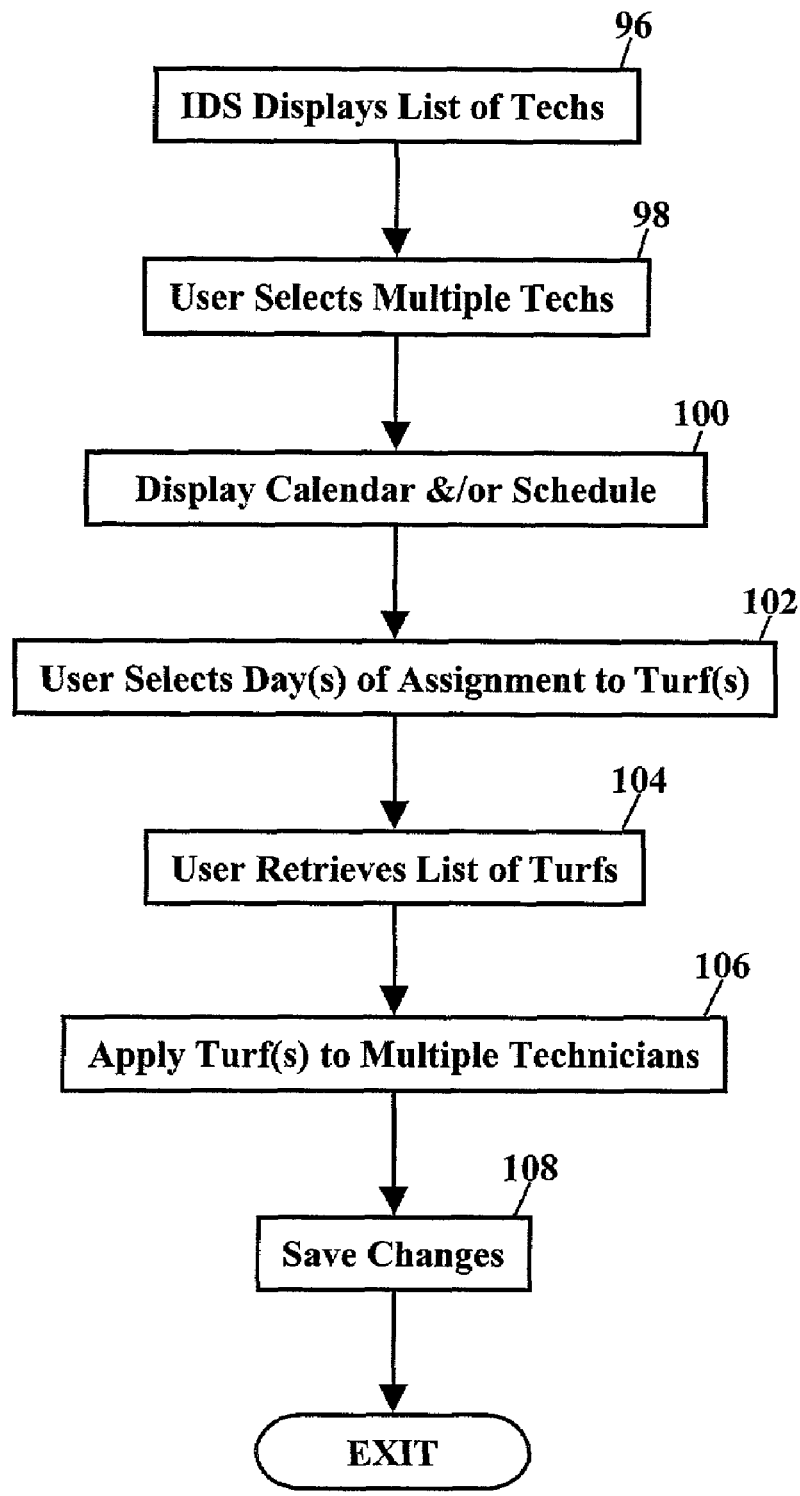
FIG. 6 is a flowchart showing one method of assigning multiple technicians to a turf.

FIG. 6 is a flowchart showing one method of assigning multiple technicians to a turf. An Integrated Dispatch System (IDS) displays a list of technicians (Block 96). A user interfaces with the Integrated Dispatch System and selects multiple technicians (Block 98). The Integrated Dispatch System may also display a calendar or schedule (Block 100), so the user may also select at least one day for which the multiple technicians will be assigned to the turf (Block 102). A list of turfs is retrieved (Block 104), and the desired turfs are applied to the multiple technicians (Block 106). The Integrated Dispatch System then allows the user to save the changes (Block 108) and to exit the program.

Figure 7:
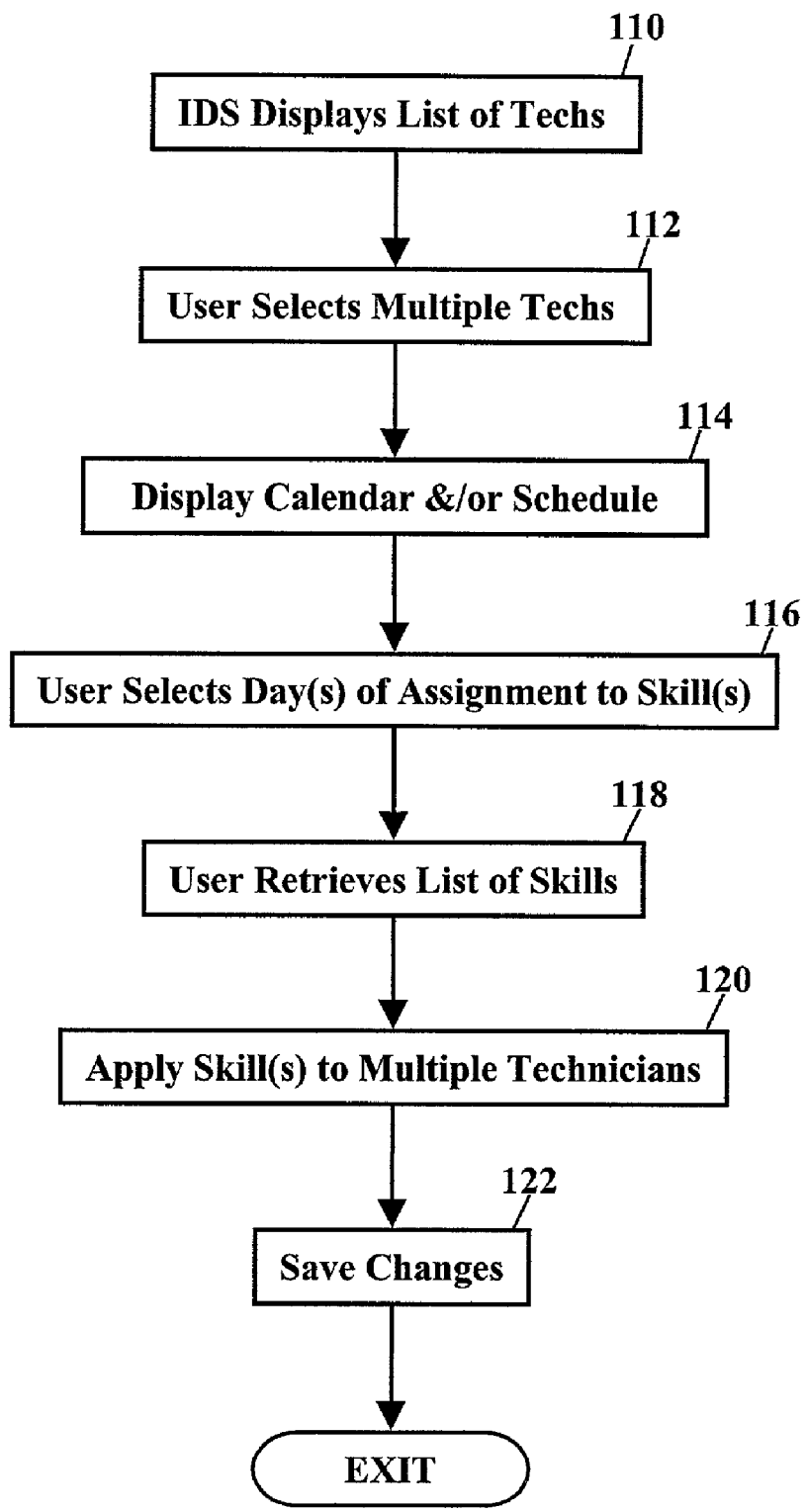
FIG. 7 is a flowchart showing one method of assigning multiple technicians to a skill level.

FIG. 7 is a flowchart showing one method of assigning multiple technicians to a skill. The Integrated Dispatch System (IDS) displays a list of technicians (Block 110). The user interfaces with the Integrated Dispatch System and selects multiple technicians (Block 112). Because the Integrated Dispatch System may display a calendar or schedule (Block 114), the user may also select at least one day for which the multiple technicians will be assigned to a skill (Block 116). A list of skills is retrieved (Block 118), and the desired skills are applied to the multiple technicians (Block 120). The Integrated Dispatch System then allows the user to save the changes (Block 122) and to exit the program. Once the multiple technicians have been assigned to the skill level for the desired day(s), the Integrated Dispatch System applies the multiple technicians and the skill level(s) to the assignment of work orders.

The Integrated Dispatch System (shown as reference numeral 20 in FIG. 1), including the methods of the present invention, may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the this invention, allow the Integrated Dispatch System to be easily disseminated. A computer program product, for assigning multiple technicians to turfs and to skill levels, comprises the computer-readable medium and the Integrated Dispatch System. The Integrated Dispatch System is stored on the computer-readable medium.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A computer implemented method for assigning multiple telecommunications technicians at one time to at least one skill and a turf, comprising:
    performing on a computer processor the following:
    allowing a user to interface on a computer display with an integrated dispatch system and to assign a group of technicians at one instance of time to a turf, the turf designating a geographic area, and at another instance of time to one or more skills, the integrated dispatch system managing dispatch of work orders for repair of a system;
    receiving the user's request for a listing of technicians;
    providing the listing of technicians;
    receiving the user's first selection of multiple technicians from the listing of technicians;
    providing the multiple technicians, a monthly calendar grid, an edit turfs button, and an edit skills button on a single screen via a graphical user interface on a computer;
    receiving the user's second selection of multiple days in the monthly calendar grid for which the multiple technicians will be assigned;
    requiring the user to select the multiple days in the monthly calendar grid before proceeding to the selection of the at least one skill level and turf for assignment to the multiple technicians;
    receiving the user's third selection of the edit skills button to assign at least one skill level to the multiple technicians;
    when the user selects the edit skills button and wishes to assign the at least one skill level to the multiple technicians, then providing a skills graphical user interface that displays an apply skills button and lists skill levels for repair of the system, each skill level describing a different qualification for repairing the system;
    receiving the user's fourth selection of the at least one skill level for assignment to the multiple technicians;
    applying any skill changes to the multiple technicians for the desired days upon the user's selection of the apply skills button,
    receiving the user's fifth selection of the edit turfs button to assign the turf to the multiple technicians;
    when the user selects the edit turfs button and wishes to assign the turf to the multiple technicians, then causing display of a turfs graphical user interface that displays an apply turfs button, lists wire centers, and lists geographic areas;
    receiving the user's sixth selection of multiple wire centers and multiple geographic areas for assignment to the multiple technicians as their turf;
    applying any turf changes to the multiple technicians for the desired days upon the user's selection of the apply turfs button; and
    as work orders are generated, dynamically reviewing the list of available technicians, their turfs, and their skill levels to determine the most efficient provisioning and/or repair of a telecommunications network.

2. A method according to claim 1, wherein when the user fails to select the multiple days in the monthly calendar grid, the Integrated Dispatch System has a default assignment of a next day.

3. A method according to claim 1, further comprising allowing the user to highlight names of the technicians.

4. A method according to claim 1, further comprising allowing the user to assign multiple technicians to more than one turf.

5. A system for assigning multiple telecommunications technicians at one time to at least one skill and a turf, comprising:
    means for allowing a user to interface with an integrated dispatch system and to assign a group of technicians at one instance of time to a turf, the turf designating a geographic area, and at another instance of time to one or more skills, the integrated dispatch system managing dispatch of work orders;
    means for receiving the user's request for a listing of technicians;
    means for providing the listing of technicians;
    means for receiving the user's first selection of multiple technicians from the listing of technicians;
    means for providing the multiple technicians, a monthly calendar grid, an edit turfs button, and an edit skills button on a single screen via a graphical user interface on a computer;
    means for receiving the user's second selection of multiple days in the monthly calendar grid for which the multiple technicians will be assigned;
    means for requiring the user to select the multiple days in the monthly calendar grid before proceeding to the selection of the at least one skill level and turf for assignment to the multiple technicians;
    means for receiving the user's third selection of the edit skills button to assign at least one skill level to the multiple technicians;
    when the user selects the edit skills button and wishes to assign the at least one skill level to the multiple technicians, then means for providing a skills graphical user interface that displays an apply skills button and lists skill levels, each skill level describing a different qualification for repairing the system;
    means for receiving the user's fourth selection of the at least one skill level for assignment to the multiple technicians;
    means for applying any skill changes to the multiple technicians for the desired days upon the user's selection of the apply skills button,
    means for receiving the user's fifth selection of the edit turfs button to assign the turf to the multiple technicians;
    when the user selects the edit turfs button and wishes to assign the turf to the multiple technicians, then means for providing a turfs graphical user interface that displays an apply turfs button, lists wire centers, and lists geographic areas;
    means for receiving the user's sixth selection of multiple wire centers and multiple geographic areas for assignment to the multiple technicians as their turf;
    means for applying any turf changes to the multiple technicians for the desired days upon the user's selection of the apply turfs button; and work orders are generated, means for dynamically reviewing the list of available technicians, their turfs, and their skill levels to determine the most efficient provisioning and/or repair of a telecommunications network.

6. A system according to claim 5, wherein when the user fails to select multiple days in the monthly calendar grid, then further comprising means for defaulting to assignment of a next day.

7. A system, according to claim 5, further comprising means for allowing the user to highlight names of the technicians.

8. A system according to claim 5, further comprising means for allowing the user to assign multiple technicians to more than one turf.

9. A computer program product comprising a computer readable medium storing processor executable instructions for performing a method for assigning multiple telecommunications technicians at one time to at least one skill and a turf, the method comprising:

allowing a user to interface on a computer display with an integrated dispatch system and to assign a group of technicians at one instance of time to a turf, the turf designating a geographic area, and at another instance of time to one or more skills, the integrated dispatch system managing dispatch of work orders for repair of a system;

receiving the user's request for a listing of technicians;

providing the listing of technicians;

receiving the user's first selection of multiple technicians from the listing of technicians;

providing the multiple technicians, a monthly calendar grid, an edit turfs button, and an edit skills button on a single screen via a graphical user interface on a computer;

receiving the user's second selection of multiple days in the monthly calendar grid for which the multiple technicians will be assigned;

requiring the user to select the multiple days in the monthly calendar grid before proceeding to the selection of the at least one skill level and turf for assignment to the multiple technicians;

receiving the user's third selection of the edit skills button to assign at least one skill level to the multiple technicians;

when the user selects the edit skills button and wishes to assign the at least one skill level to the multiple technicians, then providing a skills graphical user interface that displays an apply skills button and lists skill levels for repair of the system, each skill level describing a different qualification for repairing the system;

receiving the user's fourth selection of the at least one skill level for assignment to the multiple technicians;

applying any skill changes to the multiple technicians for the desired days upon the user's selection of the apply skills button, receiving the user's fifth selection of the edit turfs button to assign the turf to the multiple technicians;

when the user selects the edit turfs button and wishes to assign the turf to the multiple technicians, then providing a turfs graphical user interface that displays an apply turfs button, lists wire centers, and lists geographic areas;

receiving the user's sixth selection of multiple wire centers and multiple geographic areas for assignment to the multiple technicians as their turf;

applying any turf changes to the multiple technicians for the desired days upon the user's selection of the apply turfs button; and as work orders are generated, dynamically reviewing the list of available technicians, their turfs, and their skill levels to determine the most efficient provisioning and/or repair of a telecommunications network.

10. A computer program product according to claim 9, wherein when the user fails to select multiple days in the monthly calendar grid, then further comprising instructions for defaulting to assignment of a next day.

11. A computer program product according to claim 9, further comprising instructions for highlighting names of the technicians.

12. A computer program product according to claim 9, further comprising instructions for assigning multiple technicians to more than one turf.

* * * * *